S. T. DOYLE AND J. L. DICE.
PISTON RING ASSEMBLAGE.
APPLICATION FILED NOV. 19, 1920.
1,392,308.
Patented Oct. 4, 1921.
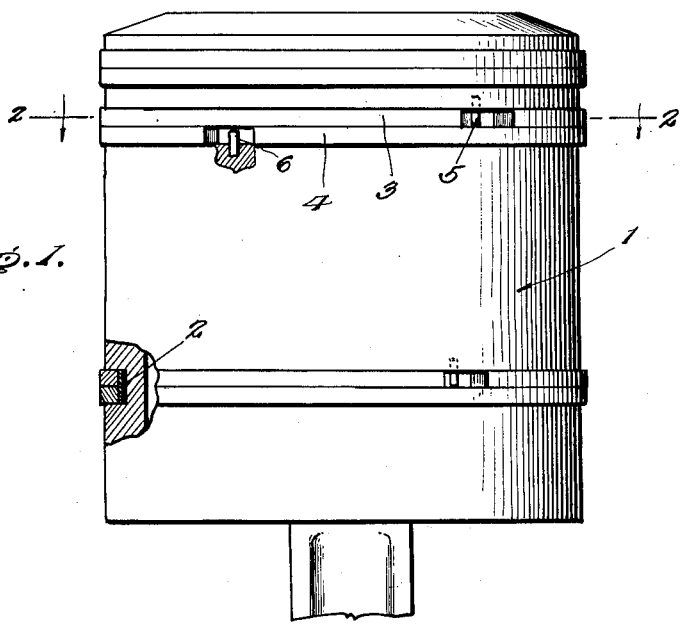
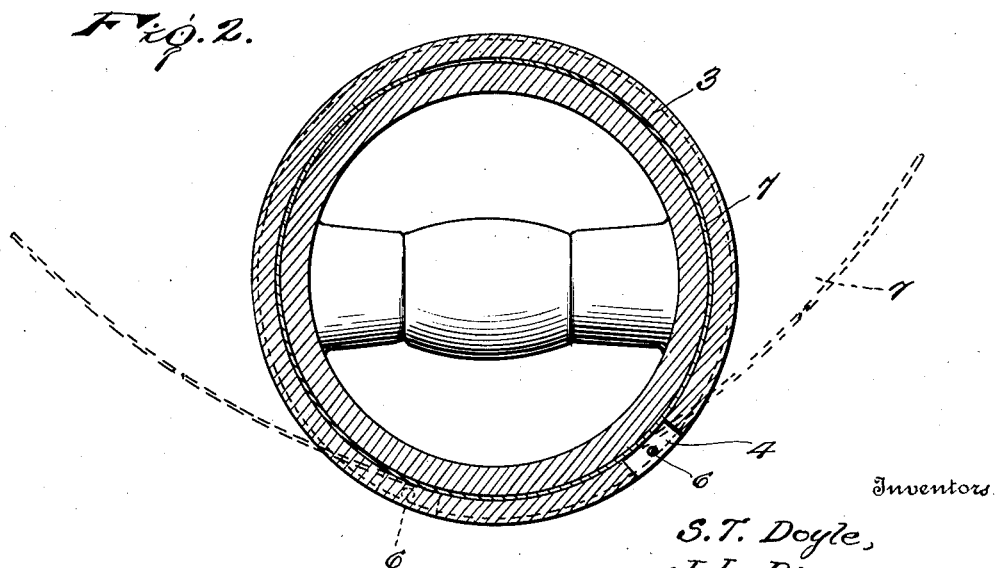

UNITED STATES PATENT OFFICE.

SILAS T. DOYLE AND JOHN L. DICE, OF CALEDONIA, OHIO.

PISTON-RING ASSEMBLAGE.

1,392,308.      Specification of Letters Patent.      Patented Oct. 4, 1921.

Application filed November 19, 1920. Serial No. 425,178.

*To all whom it may concern:*

Be it known that we, SILAS T. DOYLE and JOHN L. DICE, citizens of the United States, residing at Caledonia, in the county of Marion and State of Ohio, have invented certain new and useful Improvements in Piston-Ring Assemblage, of which the following is a specification.

This invention relates to an improved piston ring assemblage.

It has heretofore been proposed to provide a piston with rings of various constructions and in themselves resilient so that when assembled in a predetermined manner, they will expand against the cylinder wall for the purpose of securing the desired tight fit, but such rings, because they are required to be resilient, must be made of steel and must be tempered harder than the walls of the cylinder so that in time they cut into the cylinder, usually unevenly, and compression is lost or greatly impaired. The primary object of the present invention is therefore to provide a piston ring which in itself possesses little or no resiliency and may be of metal of the same degree of hardness as the cylinder wall, means being provided in connection with the ring however for expanding the same so as to adapt it to fit the cylinder wall in a gas-tight manner.

Another object of the invention is to provide in a piston ring assemblage comprising piston rings and means for expanding the same, an arrangement and construction of parts such as to permit of the ready assemblage of the expanding means with the piston and its retention in place while the rings are being fitted into the grooves provided for their reception.

Another object of the invention is to provide means for maintaining the split portions of the piston rings in suitably non-alined relation so as to prevent loss of compression through these portions of the rings coming into alinement.

In the accompanying drawings:

Figure 1 is a side elevation of the piston ring assemblage embodying the invention adapted to a piston head;

Fig. 2 is a horizontal sectional view taken substantially on the line 2—2 of Fig. 1.

In the drawings, the numeral 1 indicates a piston which may be that of a gas or any other type of engine, a pump, or the like, and which is formed with the usual circumscribing grooves 2 to receive the piston rings.

Each piston ring assemblage embodying the invention comprises a pair of rings indicated by the numeral 3 and each being in the form of a split annulus, and preferably of a metal no harder than the metal of cylinder wall in which the piston head is to work so that there will be no likelihood of scoring or undue wearing away of the said cylinder wall. Each ring 3 is of the same cross sectional dimensions throughout its entire circumference, and the split in each ring is indicated by the numeral 4. As each ring assemblage comprises a pair of the rings, each groove 2 in the piston head is of a width to accommodate a pair of the assembled rings, and for a purpose to be presently explained the upper wall of each groove is provided with a depending stud 5 and the lower wall with an upstanding stud 6, and these studs are relatively displaced circumferentially of the piston head as will be readily observed by reference to the upper portion of Fig. 1 of the drawings.

The expanding member of the piston ring assemblage is indicated in general by the numeral 7 and the said member is in the form of a suitably curved leaf spring of a width nearly equal to the width of the groove 2 and of a length equal substantially to the circumference of the bottom wall of the said groove. While the studs 5 and 6 above referred to are intended primarily for a purpose which will presently be pointed out, they are designed also to serve as a means for retaining the expanding member assembled with the piston head while the piston rings are being fitted to the head, and they serve this purpose in the manner clearly illustrated in Fig. 2 of the drawings in which figure the initial position assumed by the expanding member 7 is shown in dotted lines. As illustrated in this figure the expanding member is to be assembled with the piston head by slipping one end of the member into the groove 2 which is to receive it and then sliding the member first between the bottom wall of the groove and one of the studs, for example the stud 5, and then sliding the fitted end of the said expanding member circumferentially within the groove until its said end passes between the bottom wall of the groove and the other stud, for example the stud 6. Thus when the expanding member has been assembled with the head, its intermediate portion will be engaged between the bottom wall of the groove and the said studs 5 and 6 and the member will thus be retained assembled with the head. In slipping the rings onto the head, the projecting end portions of the expanding member will be brought inwardly until they meet within the groove, and then the first fitted ring is slipped over the upper side of the groove and at such time will circumferentially surround the expanding member and retain the same in its contracted position until the other ring is fitted into place in a similar manner.

It will be observed by reference to the drawings that in assembling the rings 3 with the piston head, the rings are so fitted into the groove 2 that the ends of the upper ring of the assemblage will be located at opposite sides of the stud 5, and the ends of the lower ring of the assemblage will be located at the opposite side of the stud 6. In other words, the studs 5 and 6 project respectively downwardly and upwardly into the split in the upper and lower rings of the assemblage. By reason of this arrangement of the parts, and due to the fact that the studs 5 and 6 are displaced with relation to each other circumferentially of the piston head, the rings are limited in their rotative movement about the piston head and cannot become so positioned that their splits will be in alinement. Thus the studs serve to prevent positioning of the rings so that a gas passage might be formed through alinement of their splits, and the studs also serve as an initial retaining means for the expanding member of the assemblage.

The member 7, in tending to expand to its original nearly flat condition, will exert outward pressure against the rings of the assemblage and thus expand these rings against the wall of the cylinder and obtain the desired gas-tight fit.

Having thus described the invention, what is claimed as new is:

The combination with a solid piston head of a length greater than its diameter and having a circumferential groove formed directly therein and unobstructed from wall to wall, of studs projecting one from the upper side wall and the other from the lower side wall of the groove, the said studs being circumferentially relatively displaced, a relatively thin expanding leaf spring member seated within the groove between the bottom wall thereof and the said studs, and piston rings of greater thickness than the expanding member and having open portions receiving the studs, the outer edges of the piston rings normally projecting beyond the circumferential surface of the piston head.

In testimony whereof we affix our signatures.

SILAS T. DOYLE. [L. S.]
JOHN L. DICE. [L. S.]